United States Patent [19]

Bar-Shay

[11] Patent Number: 5,311,785
[45] Date of Patent: May 17, 1994

[54] PROBE HOLDER FOR A ROTARY SCANNER

[75] Inventor: Abraham Bar-Shay, Silver Haifa, Israel

[73] Assignee: Nucleonics Development Company, Monrovia, Calif.

[21] Appl. No.: 849,360

[22] Filed: Mar. 11, 1992

[51] Int. Cl.$^5$ .............................. B29C 47/92
[52] U.S. Cl. ................................ 73/866.5; 73/622
[58] Field of Search ............... 73/866.5, 622, 633, 73/637, 638, 640; 250/358.1, 359.1, 360.1, 491.1; 324/261, 229, 240; 425/141, 169

[56] References Cited

U.S. PATENT DOCUMENTS

| 2,501,173 | 3/1950 | Herzog . |
| 2,822,477 | 2/1958 | Kizaur . |
| 2,879,399 | 3/1959 | Friedman . |
| 3,445,655 | 5/1969 | Curry . |
| 3,628,029 | 12/1971 | Tompkins . |
| 3,855,465 | 12/1974 | Tompkins . |
| 4,041,773 | 8/1977 | Hauldren et al. ............ 73/622 |
| 4,104,527 | 8/1978 | Tomita et al. . |
| 4,187,425 | 2/1980 | Thompson . |
| 4,187,429 | 2/1980 | Tomita et al. . |
| 4,393,305 | 7/1983 | Shimizu et al. . |
| 4,491,731 | 1/1985 | Funyu et al. . |
| 4,759,048 | 7/1988 | Ohlson . |
| 4,768,940 | 9/1988 | Poiesz ......................... 73/622 |
| 4,813,064 | 3/1989 | Jackson, III et al. . |
| 4,961,214 | 10/1990 | Van Endschot et al. . |

FOREIGN PATENT DOCUMENTS

| 0819706 | 4/1981 | U.S.S.R. ................ 73/622 |
| 1089502 | 4/1984 | U.S.S.R. ................ 73/866.5 |

*Primary Examiner*—Robert Raevis
*Attorney, Agent, or Firm*—Pretty, Schroeder, Brueggemann & Clark

[57] ABSTRACT

A probe holder for a rotary scanner, the probe holder having a shaft and a plate rotatably mounted to the shaft. A parallelogram arrangement comprising a probe support on one side for holding a probe, an annular counterweight on an opposite side and a pair of levers therebetween secured to the plate. A spring mechanism in the annular counterweight moves the probe radially inwardly into contact with a pipe to be measured. A pair of spring-biased arms for contacting the pipe and centering the probe on the pipe are mounted to one end of the plate. A second counterweight is secured to the other end of the plate to counterbalance the contact arms.

20 Claims, 5 Drawing Sheets

PROBE HOLDER FOR A ROTARY SCANNER

This invention relates generally to devices that hold probes for measuring the wall thickness of pipe and, in particular, to a holder that supports a probe while enabling it to non-destructively and continuously measure the thickness of pipe as it is being extruded.

BACKGROUND OF THE INVENTION

Various methods have been used to measure the wall thickness of pipe as it is being extruded. Often a rotary type scanner is used which permits inspection of the circumference of the pipe along a generally helical path, with the pitch or axial spacing between adjacent portions of the helical inspection path being determined by the relative rotational speed of a sensing probe used to inspect the pipe as well as the relative axial speed of the pipe.

A rotary scanner generally includes a frame having a rotatable ring. Extruded pipe is directed through the ring and ideally the pipe is centered within the ring. A sensing probe is connected to the rotatable ring and is directed generally radially toward the center of the ring and pipe. Rotation of the ring enables the probe to scan a full 360° around the pipe.

Typically, the scanner is located as close as possible to the pipe extrusion outlet in order to minimize the length of lost pipe after a flaw has been detected by the probe. However, a first cooling station is generally placed between the extruder and the scanner to firm up the pipe wall prior to its measurement by the probe. Even then, the flowing pipe is still hot and soft and a second cooling station may be necessary after the pipe has been measured. In this system, the first and second cooling stations can act as supports for the pipe as it passes through the scanner.

As the pipe passes through the rotary scanner, its wall thickness is continuously measured by the sensing probe. The information obtained by the probe is used to provide a thickness profile of the external surface of the pipe. Deviations from standard thickness may be corrected immediately, for example, by adjusting die bolts on the extruder.

One type of probe particularly adapted for use with a rotary scanner is a nucleonic gamma gauge which operates on the principle of Compton photon backscatter (commonly known as gamma backscatter). The sensing probe holds a radioactive isotope that emits low-energy gamma rays (photons) which are collimated and beamed at the inspected material. The gamma rays are then scattered back toward a detector portion of the probe in direct proportion to the thickness of the material in front of the probe. An efficient scintillation crystal/photomultiplier detector converts the backscattered photons to an electrical signal, which in turn can be related to weight-per-unit area or thickness (if material density is constant).

Because gamma probes can measure thickness from just one side of the material, they are ideally suited for measuring wall thickness of pipe and tubing. To achieve maximum effectiveness, however, the gamma probe (and collimated beam) should be maintained normal to, and in contact with, the surface to be measured. This is particularly difficult to do with freshly extruded pipe, which is still quite flexible and easily deflected, even after it has passed through the first cooling station.

For example, because of its flexibility and flowing speed, and because of the spacing between the supports of the first and second cooling stations, the extruded pipe tends to wobble as it passes through the rotary scanner. This wobbling can cause a radial displacement of the pipe relative to the scanner ring, i.e., the pipe is not stable in the ring and changes location during probe rotation. Because of this wobbling, two problems occur with respect to accurate measurement of wall thickness by the sensing probe. First, the probe may lose contact with the wobbling pipe and, second, the probe will not remain radially directed toward the center of the pipe and thus will lose its perpendicular relationship to the exterior surface of the pipe.

One method used to correct the first problem has included the use of a spring-loaded probe holder which exerted a force on the probe, pushing it toward the exterior surface of the pipe. The spring force, however, occasionally provoked deformation or scratching of the soft pipe and corresponding inaccurate readings from the probe were obtained. Furthermore, it was often necessary to use an excessively high spring force to overcome the probe weight when the probe was located in the six o'clock position of the scanner (i.e., the probe pointed vertically upward and inward). This, however, resulted in the probe applying a contact force of greater than twice the probe weight when the probe was in the twelve o'clock position (i.e., pointed vertically downward and inward).

One method used to correct the problem of maintaining the probe directed toward the center of the pipe included the use of a pair of tangent V arms or a pair of rollers secured to a rotatable probe support. The arms or rollers would contact the exterior surface of the pipe at two points around the circumference of the pipe causing the probe support and probe to rotate and follow the pipe as it wobbled. However, this arrangement could not efficiently cover a large range of pipe diameters and did not insure that the probe would remain in nondestructive contact with the pipe.

Accordingly, a need has arisen for a probe holder that maintains a probe in contact with an external surface of a pipe to be measured, such that the contact force between the probe and pipe is maintained at a small and constant value at any circumferential position around the pipe. It is also desirable that such a holder point the probe toward the center of the pipe regardless of the wobbling effect acting on the pipe as it passes through the scanner ring. Such a probe holder should also be fully counterbalanced so as not to exert any excessive force or cause damage to the pipe being measured.

SUMMARY OF THE INVENTION

The present invention is embodied in a probe holder for securing a sensing probe to the ring of a rotary scanner such that the probe is maintained in proper alignment with a pipe to be inspected by the probe. A feature of the probe holder is its ability to maintain the probe in contact with the pipe and cause the probe to exert a small and, preferably, constant contact force during a 360° scan along the exterior surface of the pipe. Another feature of the probe holder is its ability to cause the probe to follow any radial displacement of the pipe as it passes through the ring of the rotary scanner. Through these features and others, the present invention is able to counteract the effect of wobbling of the pipe, thus maintaining the probe in its optimal contact position with the pipe.

The probe holder includes a parallelogram arrangement comprised of two pairs of levers that are secured to a mounting device for securing the parallelogram arrangement to the ring of the rotary scanner. The mounting device is preferably a support or a plate rotatably mounted on a shaft with the shaft releasably secured to the ring of the rotary scanner.

A center portion of each lever is pivotally connected to the ring mounting device, e.g., the plate, while one end of each of the levers is connected to the sensing probe or, preferably, to a probe support for holding the sensing probe. The other end of each of the levers is connected to a counterweight to counterbalance the effect of the weight of the probe against the exterior surface of the pipe to be measured. In other words, the counterweight creates a zero gravity effect on the probe as it rotates around the pipe during a 360° scan. Additionally, if the pipe begins to wobble in a direction along the longitudinal axis of the sensing probe during inspection, then the levers will cause the probe to move with the pipe, thus maintaining contact between probe and pipe. Although the preferred embodiment is described using two pairs of levers, the probe holder may work suitably in some situations using a single pair of levers.

The parallelogram arrangement is also provided with a housing containing a spring which is designed to overcome the friction at the pivot points of the levers and to maintain the required contact force between the probe and pipe in any position during a 360° scan. A screw in the housing may be used to adjust the spring force.

Another feature of the invention is a pair of contact arms that press uniformly against the pipe to be measured. The contact arms are connected to the ring mounting device, preferably to the lower end of the plate previously mentioned. The probe may then be secured to the plate such that its longitudinal axis bisects the angle formed between the two contact arms. In this manner, the probe and the plate will rotate to follow the sideways wobble of the pipe and to maintain the radial alignment of the probe with the pipe.

A gear box having two identical meshed gears, one for each contact arm, may be used to cause the contact arms to move symmetrically with respect to the probe axis when properly calibrated. A cam and slot arrangement, a timing belt, a metal strip or other device known to those having skill in the art may also be used to achieve this result. A constant force spring may be employed to keep the contact arms in contact with the pipe. Through the use of the meshed gears and constant force spring, the contact arms will follow any wobble of the pipe along the probe axis by rotation of the contact arms themselves, i.e., the angle between the arms will increase or decrease to account for the displacement of the pipe. This reduces to an acceptable level the deformation of the pipe caused by the contact arms. This also allows the arms to work with any pipe diameter that can pass through the ring of the scanner. A counterweight is provided at the upper end of the plate to further reduce the effect of the weight of the contact arms against the pipe surface. A calibration device is also described herein for the initial centering of the contact arms in relation to the plate.

During operation of the scanner and while the pipe is being continuously extruded, the probe holder permits the probe to follow pipe wobble while at the same time maintaining contact with the pipe surface. Thus, the probe is able to provide reliable and precise information for determining pipe wall thickness. In addition, use of the described probe holder results in faster start-up of the pipe extrusion process, increased yield, reduced scrap and improved quality. The counterbalancing features of the invention further reduces damage to the pipe.

Other features and advantages of the present invention should become apparent from the following description of the preferred embodiment, taken in conjunction with the accompanying drawings, which illustrate by way of example, the principles of the invention.

DESCRIPTION OF THE PREFERRED EMBODIMENT

Figure 1:
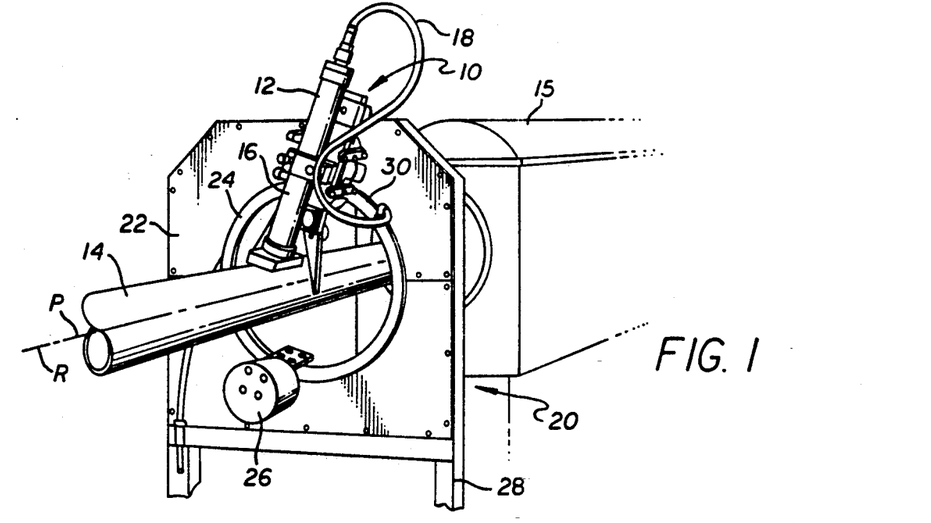
FIG. 1 is a perspective view of a probe and probe holder made according to the present invention mounted to a rotary scanner that is located in a pipe extrusion line.

A probe holder 10 embodying the features of the present invention is shown in FIG. 1 holding a sensing probe 12 and mounted to a rotary scanner 20. The scanner includes a frame 22, a rotatable ring 24, a counterweight 26 and a transportable support 28. The counterweight is attached to the ring opposite from the probe holder to counterbalance the weight of the probe holder and probe. The transportable support uses wheels, rollers or the like to permit the scanner to be inserted anywhere along a pipe extrusion line, e.g. a plastic pipe line such as that used in the gas industry.

The frame 22 of the scanner 20 contains a motor, gears and track system (not shown) known to those skilled in the art for rotating the ring 24. The motor may be connected to a controller (not shown) to control the speed and direction of rotation of the ring and hence the speed and scanning direction of the sensing probe 12.

Extruded pipe 14 is typically pulled from an extruder (not shown) through a first cooling station 15 before being passed through the ring 24 of the scanner 20. The pipe is then pulled through a second cooling station (not shown) before being further processed, cut and stored. Even after passing through the first cooling station, the pipe may still be hot and soft and will deflect by its own weight between the first and second cooling stations. Preferably, the rotary scanner is placed at the midpoint between the cooling stations because this is the location where the slope of the deflected pipe equals zero. The height and lateral location of the frame are also adjusted such that a centerline P of the pipe and a centerline R of the ring 24 are substantially aligned.

The sensing probe 12 preferably includes a gamma backscatter gauge 16. However, other types of sensing probes may be used as well, such as other types of nucleonic gauges, ultrasonic gauges, X-ray fluorescence gauges, optical probes, etc. The gamma gauge is connected to an electrical cable 18, which may be initially fixed to and wrapped around an outer peripheral surface 30 of the ring 24. The cable may also be attached to a cable retraction device (not shown) for reducing the length of electrical cable lying in the area of the pipe extrusion line.

Figure 2:
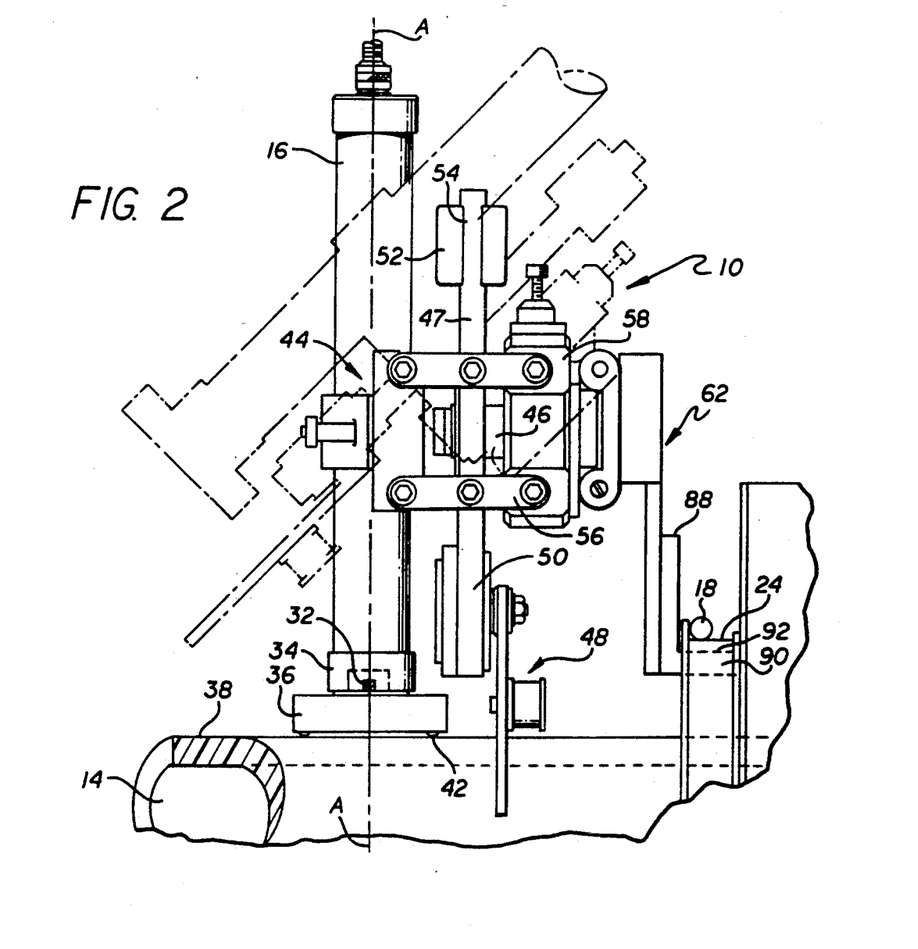
FIG. 2 is an elevational side view of the probe and probe holder depicted in FIG. 1 with the probe and probe holder shown in its breakaway position in phantom.

With reference now to FIG. 2, a first end 34 of the gamma gauge 16 defines a centrally located recess which contains a radioactive isotope 32. A probe end cap assembly 36 is secured to, and centered on, the first end of the gauge. The assembly acts as a spacer between the radioactive isotope and an exterior surface 38 of the pipe 14. Ideally, the isotope is maintained at 3 mm ± 0.5 mm, from the surface to be measured and the gamma rays are collimated and beamed in a direction along a longitudinal axis A of the gauge. In the preferred embodiment, the assembly includes a pair of rollers 42 for tangentially contacting the exterior surface 38 of the pipe 14.

The sensing probe 12 is secured to a probe support 44 of the probe holder 10. The preferred probe holder further includes a spindle 46, a plate 47 rotatably mounted to the spindle, a contact arm mechanism 48 secured to a lower end 50 of the plate, a counterbalance mechanism 52 secured to an upper end 54 of the plate, a set of levers 56 rotatably mounted on the plate, an annular counterbalance mechanism 58 mounted to each lever and a ring attachment mechanism 62 mounted on the spindle 46. The probe holder may be made from black anodized aluminum and stainless steel.

As will be seen, the preferred probe holder is adapted to hold the sensing probe such that the longitudinal axis A of the probe is directed toward the center P of the pipe 14, even if the pipe moves offcenter with relation to the centerline R of scanning ring 24. Additionally, the preferred probe is designed to maintain a small, but constant contact force between the probe and pipe at any position around the pipe.

With reference now to FIGS. 3-7, the preferred probe holder 10 is described in more detail. The spindle 46 includes the cylindrical shaft 64 having a longitudinal axis S and a shaft head 66 at a first end 68 of the shaft. A spindle nut 70 may be secured to a second end 72 of the shaft in any conventional manner, such as by a threaded engagement of the nut and shaft.

Figure 3:
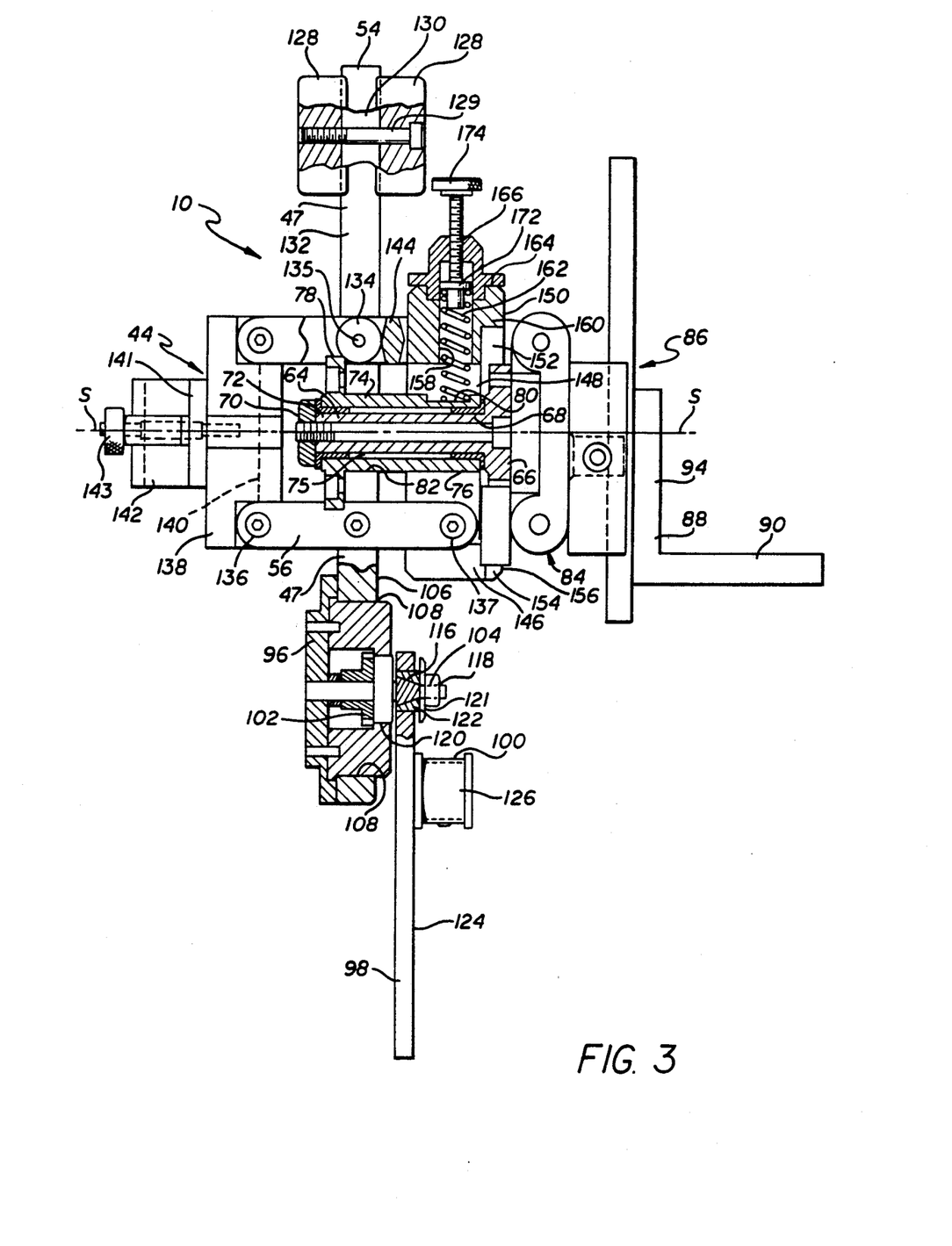
FIG. 3 is an elevational side view of the probe holder depicted in FIG. 1 with the probe holder shown in section.

The spindle 46 also includes a housing 74 defining a cylindrical opening 75 for receiving the shaft 64. The housing is disposed between the shaft head 66 and the spindle nut 70 and freely rotates on the shaft 64. The housing also includes an outer cylindrical surface 76 and a fastening head 78 at one end of the surface 76. A circular depression 80 is formed on the outer cylindrical surface near its other end.

The spindle 46 is connected to the scanner ring 24 by the ring attachment means 62 which includes a breakaway portion 84 (see FIG. 8), a dovetail portion 86 (see FIG. 9) and a mounting bracket 88. The mounting bracket 88 is an angle piece having a first leg 90 which is connected to an inside surface 92 of the ring 24 (see FIG. 2) and a second leg 94 connected to the dovetail portion 86. In the preferred embodiment, the first leg and second leg are perpendicular such that the spindle shaft axis S is maintained in a parallel relationship with the first leg 90 of the mounting bracket and hence parallel to the centerline R of the ring of the rotary scanner. It should be understood that the ring attachment mechanism 62 may comprise any combination of the breakaway portion 84, the dovetail portion 86 and the mounting bracket 88 or the mounting bracket only. Other mechanisms for securing the spindle to the ring known to those skilled in the art may also be used.

The spindle 46 is inserted through a circular opening 82 defined in the plate 47 and is connected to the plate by anchoring the fastening head 78 of the spindle housing 74 to the plate. In this manner, the spindle housing and plate rotate together about the spindle shaft 64.

The contact arm mechanism 48 secured to the plate 47 includes a gear box 96, a pair of contact arms 98 and a constant force spring 100. The gear box is mounted to the plate through an opening 108 of the plate at the lower end thereof. A pair of identical meshed gears 102 are inserted into the gear box. Each gear has a shaft 104 extending through respective circular openings 120 in the gear box such that the shafts are disposed outwardly from and perpendicular to an inner surface 106 of the plate. In the preferred embodiment, each gear shaft 104 has a truncated conical portion 116 and a threaded portion at the free end of the shaft.

Figure 10:
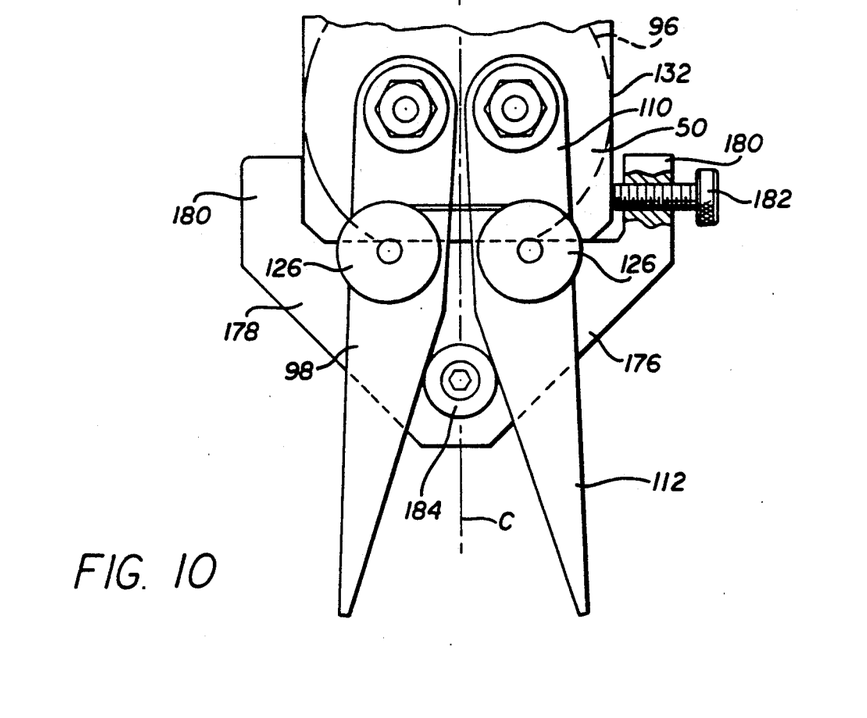
FIG. 10 is a rear elevational view of a portion of the probe holder depicted in FIG. 1 and an adjusting device used to calibrate the contact arms.

Each contact arm 98 includes a mounting portion 110, preferably rectangular in shape, and a blade portion 112, preferably right triangular in shape (see also FIG. 10). The contact arms 98 are mounted to the gear shafts 104 by means of a pair of conical split rings 122 that engage the truncated conical portions 116 of the shafts. A washer 121 is pushed by a nut 118 to push the split ring which expands over the conical portion of the shaft and locks each arm onto its respective shaft.

A spool 126 or other cylindrical type member is mounted to a face 124 of each contact arm 98. The constant force spring 100 is coiled around and secured to each spool 126. In the preferred embodiment, the contact arms 98 extend downwardly from and parallel to the plate 47. The blade portions 112 of the contact arms 98 form an essentially upside-down "V" for cradling the pipe 14 to be measured (see also FIGS. 5 and 10).

The counterbalance mechanism 52 includes a pair of counterweights 128, one mounted on each side of the upper end 54 of the plate 47 and secured to each other by a fastener 129 through a slot 130 in the plate. The slot 130 permits the counterweights to be slid along the upper end of the plate either toward or away from the spindle 46 (see also FIG. 4B).

Two pairs of levers 56 are secured to side edges 132 of the plate, one pair on each side of the plate. Preferably, the levers are mounted by a pin 135 to the plate at their midpoint using a frictionless washer 134, such as a Teflon washer, between the lever and the plate. Alternatively, a Teflon bushing (not shown) may be used wherein the bushing has a cylindrical portion between the pin and lever and a flange portion between the lever and plate. In order to increase the stiffness of the levers, each pair is linked together by a middle beam 144 so that each pair becomes one solid part having a substantially "H" form.

The probe support 44 is connected to a first end 136 of the levers 56, again utilizing frictionless washers. The probe support includes a block 138 having a half cylinder portion 140 for receiving the sensing probe 12 and a half cylinder lock 142 which is releasably secured to the block for supporting the probe between the half cylinders. In the preferred embodiment, the lock 142 has flanges 141 extending from each side of the interior cylindrical surface of the lock. A bolt 143 is inserted through an opening in each flange to mount the lock to the block. Many other devices are also available and known by those skilled in the art for securing the sensing probe to the levers. The probe support may also be omitted entirely wherein the sensing probe is secured directly to the first end of the levers.

The annular counterbalance mechanism 58 includes an annular counterweight 146 that is secured to a second end 137 of the levers 56 using frictionless washers or bushings. The counterweight 146 defines a central opening 148 through which the spindle 46 passes. A rear face 150 of the counterweight includes a circular recessed portion 152 for receiving the shaft head 66 of the spindle shaft 64 and a slot 154 defined in a lower end 156 of the rear face 150 (see also FIGS. 6A-6C). The central opening 148 and recessed portion 152 are large enough to allow the annular counterweight to clear the spindle shaft and the shaft head, respectively, during oscillation of the counterweight on the levers.

The annular counterweight 146 also defines a radially extending opening 158 through a top portion 160 of the counterweight for receiving a spring 162. The top portion has a shoulder portion 164 surrounding the opening 158 for supporting a spring housing 166. The spring mechanism is assembled by inserting the spring into the opening. One end of the spring contacts the circular depression 80 of the spindle housing 74. The other end of the spring is covered by a washer 172. The spring housing 166 is then secured to the shoulder portion 164 and an adjustable plunger or screw 174 is inserted through the spring housing and contacts the washer for adjusting the spring force.

The combination of levers 56, probe support 44 and annular counterweight 146 forms a parallelogram arrangement wherein a cylindrical probe secured within the probe support 44 will maintain a parallel relationship with the plate 47 and the annular counterweight 146 throughout the range of rotation of the levers. As shown in FIG. 5, the sensing probe 12 is further aligned such that the probe axis A bisects the angle formed between the contact arms 98. This is done by centering the probe and the contact arms on a centerline C of the plate 47 passing through the center of the spindle. Such an arrangement ensures that the probe axis A will follow the centerline P of the pipe 14 as it wobbles through the scanner ring (see FIG. 4A).

Proper alignment of the sensing probe 12 and the contact arms 98 is achieved by an initial calibration of the contact arms. With reference now to FIG. 10, a calibration device 176 is secured to the lower end 50 of the plate. The device includes a flat frame 178 having two legs 180 for gripping the side edges 132 of the plate. A locking screw 182 temporarily secures the device 176 to the plate during calibration of the contact arms. Extending outwardly from the frame 178 is a centering cylinder 184 which is inserted between the contact arms. The contact arms are calibrated by releasing the connection between the contact arms and the gear shafts 104, bringing each contact arm into engagement with the centering cylinder 184 and re-tightening the connection. Calibration results in the arms being centered on the plate such that the arms will rotate symmetrically about the centerline C of the plate. Coordinated movement of the arms is due to the identical meshed gears 102 in the gearbox.

Figure 4A:
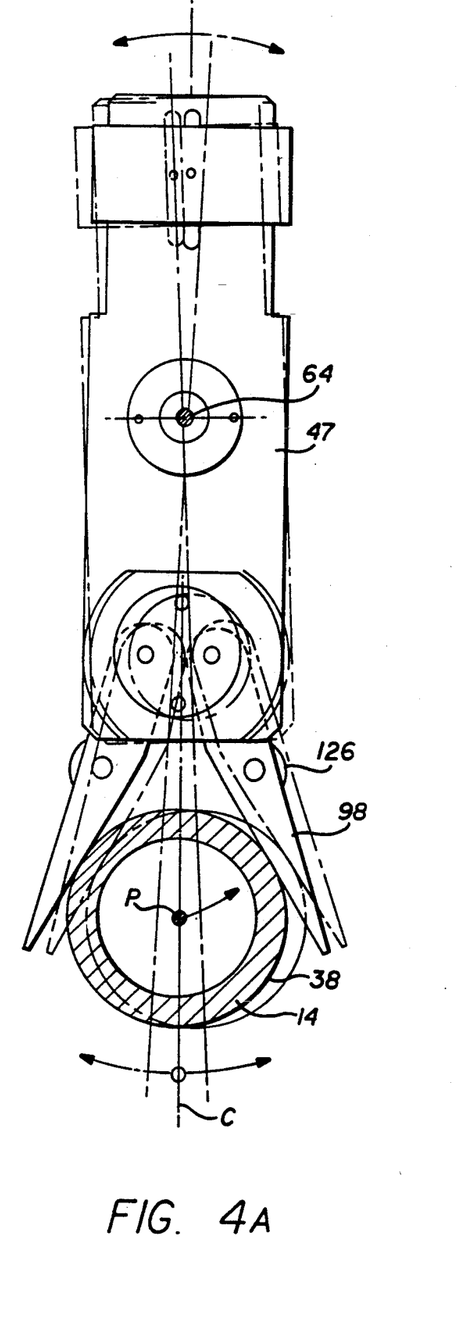
FIG. 4A is an elevational front view of the probe holder depicted in FIG. 1 showing the probe holder in a non-rotated position (in solid lines) and a rotated position (in phantom).
Figure 4B:
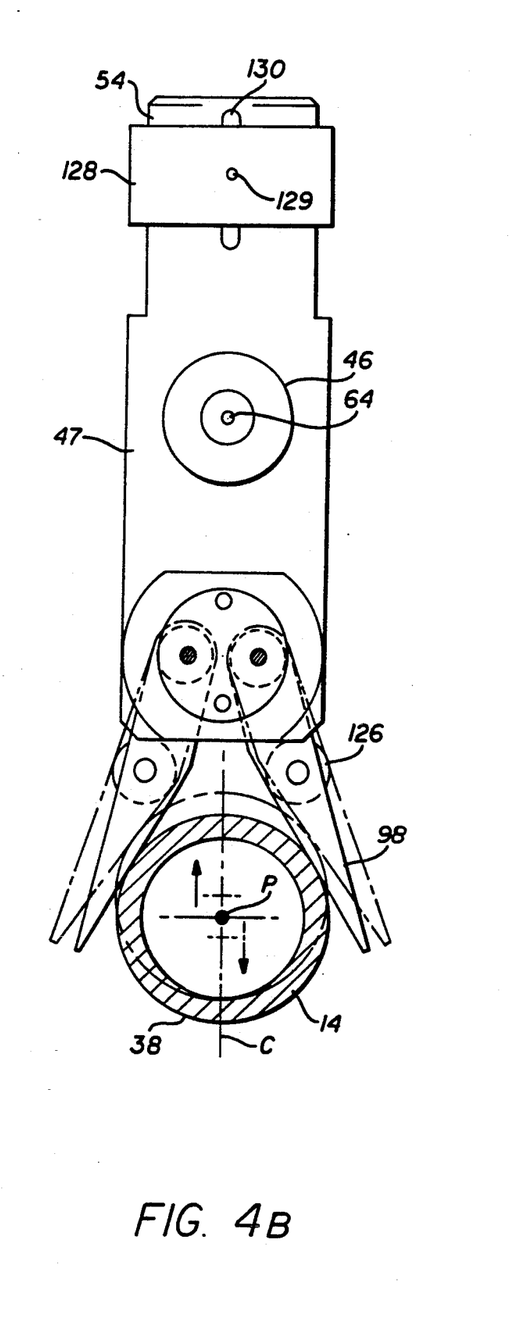
FIG. 4B is an elevational front view of the probe holder depicted in FIG. 1 showing the contact arms of the probe holder in a first position (in solid lines) and a second, further separated, position (in phantom).
Figure 5:
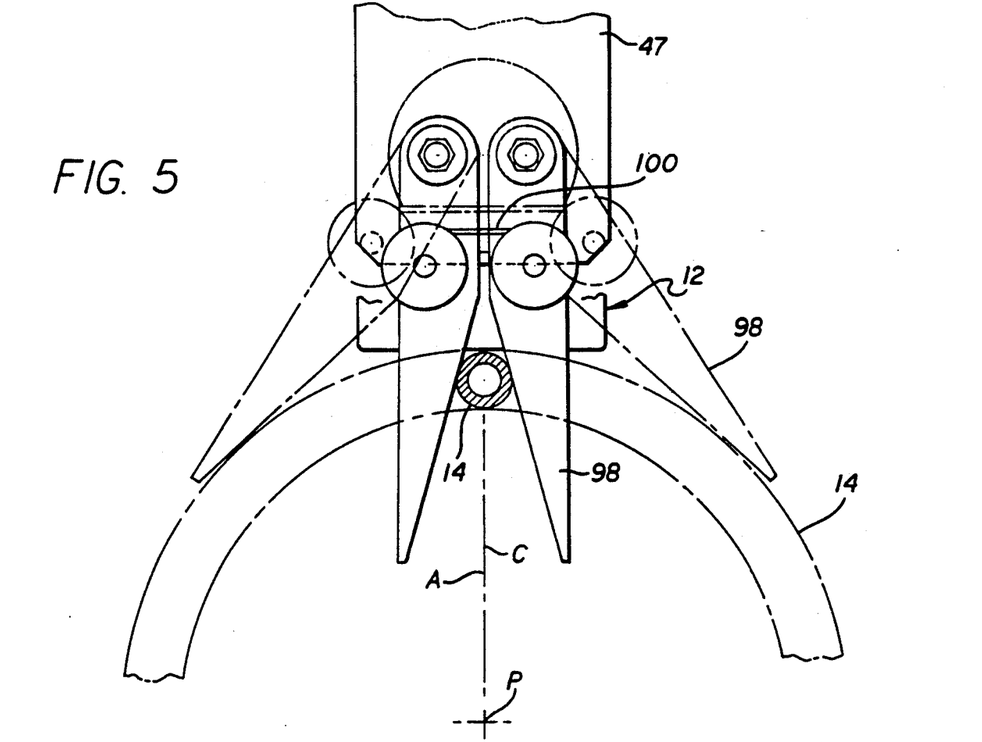
FIG. 5 is an elevational rear view of the probe and probe holder depicted in FIG. in three-contact position with a small pipe (in solid lines) and a large pipe (in phantom).

With reference now to FIGS. 4A, 4B, and 5, the operation of the contact arms 98 against the pipe 14 will be explained in greater detail. Initially, the probe holder 10 is adjusted radially with respect to the scanner ring 24 through use of the dovetail portion 86 (see FIG. 9) such that the contact arms 98 cradle the exterior surface 38 of the pipe. The constant force spring 100 mounted to spools 126 will keep the arms 98 in contact with the pipe. The contact force should be sufficient to rotate the plate 47 about the spindle shaft 64 as the pipe wobbles, but should not be so great as to harm the pipe's surface.

With the contact arms properly calibrated, the centerline C of the plate and the probe axis A will pass through the centerline P of the pipe (see FIG. 5). If the pipe wobbles in a crosswise direction, the contact arms will follow the pipe by rotating about the spindle shaft 64 (see FIG. 4A). If the pipe wobbles upwardly or downwardly, the contact arms will diverge or converge respectively and maintain contact with the pipe (see FIG. 4B). In either situation, the probe will point to the center of the pipe, thus ensuring a precise measurement for determining pipe wall thickness.

Figure 6A:
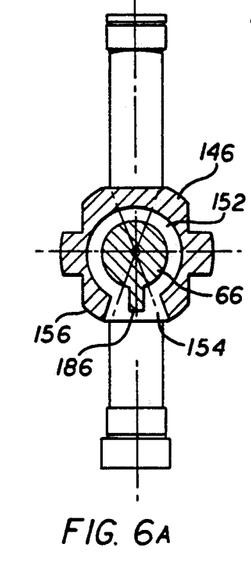
FIGS. 6A-6C are elevational rear views of the probe and probe holder depicted in FIG. 1, partially in section, showing the tilting range of the probe.
Figure 6B:
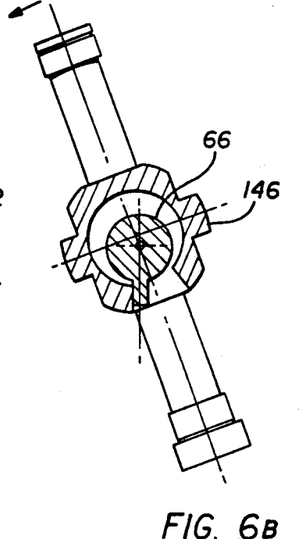
Figure 6C:
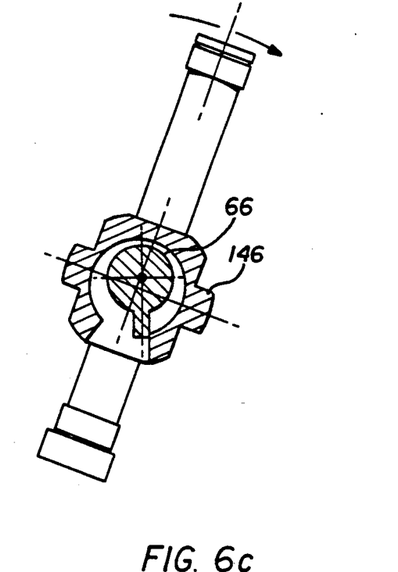

With reference to FIGS. 6A-6C, rotation of the probe about the spindle shaft is limited by a key 186 that is connected to the shaft head 66 of the spindle shaft. The key extends radially outwardly from shaft head 66 and into the slot 154 of the annular counterweight 146. Preferably, the width of the slot is designed to accommodate more than twice the amount of pipe wobble that is deemed acceptable. FIGS. 6A-C also illustrate the clearance provided between the spindle shaft head and the annular counterweight at extreme pivoted positions of the levers.

Figure 7:
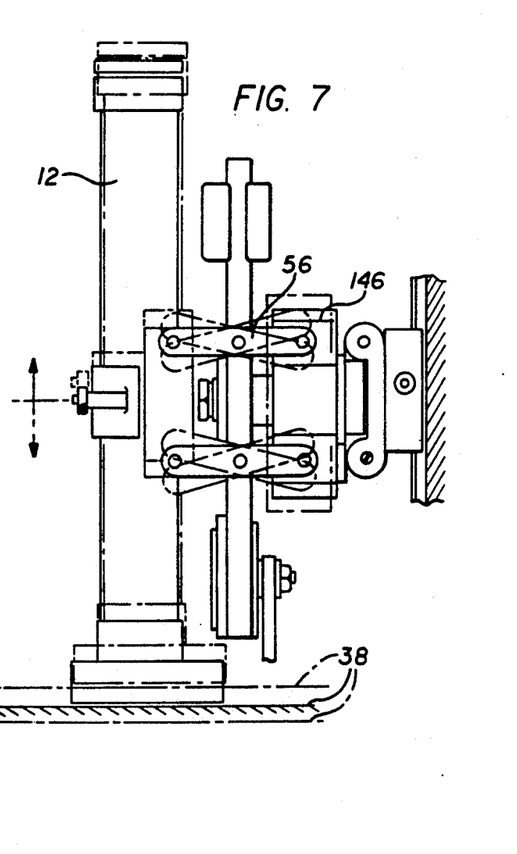
FIG. 7 is an elevational side view of the probe and probe holder depicted in FIG. 1 showing the probe and probe holder in a neutral position (in solid lines) and an outer displaced position (in dashed lines), and further showing the probe holder in an inner displaced position (in dashed lines).

The movement of the sensing probe, levers and annular counterweight caused by the wobbling pipe is illustrated in FIG. 7. In particular, due to the parallelogram arrangement, the probe 12 moves on a radial line toward the pipe center. Preferably, the probe displacement range is large enough to cover pipe wobbling and the situation where the pipe and scanner ring are slightly off-center.

The parallelogram arrangement provides a zero gravity feature caused by counterbalancing the weight of the probe and probe holder by the weight of the annular counterweight. In particular, when the torque on each lever at the pivot point on the plate is equal to zero, the effect of gravity on the probe will be cancelled, i.e., the force acting on the exterior surface of the pipe due to the probe weight is counterbalanced by the annular counterweight.

The spring 162 in the annular counterweight 146 may be used to impart a constant, but minimal, contact force, preferably less than two pounds, on the pipe by the probe. By adjusting the plunger 174, the annular counterweight will be moved relative to the spindle 46 and by way of the levers 56, the probe will either increase or decrease its contact force on the pipe. The spring 162 is designed to overcome the friction in the pivot connections of the levers and to keep the required contact between the probe and the pipe at any position of a 360° scan. Preferably, a preloaded spring having a low spring constant is used, such that once the spring is set, any movement of the annular counterweight with respect to the spindle will not significantly affect the force applied by the spring.

For scanning very small pipe, e.g. less than one inch in diameter, it is recommended that the pipe be supported from below by a separate frame having a roller system, one roller on each side of the probe holder for the pipe to roll along. This will reduce deformation of the pipe during inspection.

With reference again to FIG. 5, the preferred three-point contact system is illustrated. Due to the action of the levers 56 and the constant force spring 100, pipe having a wide range of diameters may be used with the probe holder described herein. Three point contact is maintained because the probe is permitted to move radially toward the pipe by way of the lever action and the contact arms 98 are permitted to rotate about the spindle shaft 64 to follow the wobble of the pipe. The contact arms are also permitted to diverge or converge depending on the size of the pipe or pipe wobble. They are designed to keep the probe's axis directed to the pipe's center for any pipe diameter that can pass through the ring of the scanner.

It should be recognized that the contact arms will apply an unequal force on the pipe when the probe holder is in a non-vertical position with respect to the pipe. For example, when the probe holder is in the three o'clock or nine o'clock position on the scanner ring, the upper contact arm may press too hard on the pipe causing deformation and scratching and the lower arm may lose contact taking the probe axis off-center. To overcome this effect, the counterweights 128 at the upper end of the plate are moved in the slot to counterbalance the weight of the gearbox and contact arms at the lower end of the plate. Counterbalancing may be achieved by holding the spindle shaft and adjusting the counterweights 128 until the plate rests freely in a three o'clock or nine o'clock position.

Figure 8:
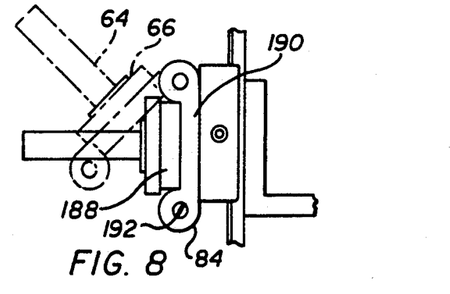
FIG. 8 is a side elevational view of the rear portion of the probe holder depicted in FIG. 1, showing the probe holder in the connected position (in solid lines) and the breakaway position (in phantom).

With reference to FIGS. 2 and 8, the probe holder is depicted in phantom in a breakaway position, i.e., the probe is removed from pipe contact without removing the probe holder from the scanner ring. The breakaway portion 84 is a safety feature designed to quickly remove the probe containing the nuclear source from the pipe, if necessary. The breakaway portion 84 includes a hinge plate 188 that is connected to the head 66 of the spindle shaft 64 and a locking flange 190. One end of the hinge plate is pivotally secured to one end of the flange The other end of the plate is releasably secured to the other end of the flange by a ball spring 192 that is adjusted to determine the proper breakaway torque.

Figure 9:
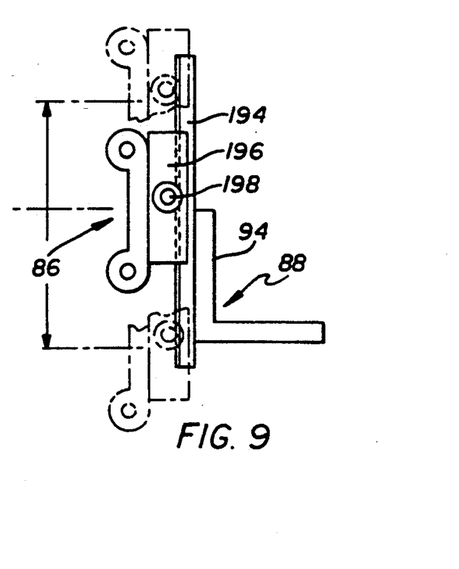
FIG. 9 is a side elevational view of the dovetail mount and block of the probe holder depicted in FIG. 1.

FIG. 9 depicts the dovetail portion 86 of the probe holder. The dovetail portion includes a dovetail block 194, a dovetail mount 196 and a carriage lock 198. The dovetail block is connected to the vertical leg 94 of the mounting bracket 88 The dovetail mount is secured in the block and is vertically adjusted as is necessary to bring the probe 12 into contact with the pipe 14. The carriage lock is tightened to fixedly secure the mount to the block. The dovetail portion may be adjusted vertically by either moving the block with respect to the vertical leg 94 or moving the mount with respect to the block.

Although the invention herein has been described with reference to particular embodiments, it is to be understood that these embodiments are merely illustrative of the principles and applications of the present invention. For example, any of the features, such as the contact arm mechanism, the counterbalancing mechanisms, the spring mechanisms and the parallelogram arrangement, may be used independently of each other. Consequently, the specific structural and functional details disclosed herein are merely representative and are deemed to afford the best embodiments known at this time. Furthermore, it is to be understood that numerous modifications may be made to the illustrative embodiments and that other arrangements may be devised without departing from the spirit and scope of the present invention as defined by the appended claims.

I claim:

1. A holder for mounting a probe to a ring of a rotary type scanner, the probe having a sensing beam directed along a probe axis of the probe for inspecting a pipe extending through the ring, the scanner having means for rotating the ring such that the holder, when mounted to the ring, is movable 360 degrees around the pipe, the holder comprising:
   a shaft for mounting to the ring of the rotary type scanner, the shaft having a longitudinal axis;
   a support rotatably mounted to the shaft;
   a counterweight; and
   a pair of levers pivotally mounted to the support, each of the pair of levers having a first end portion and a second end portion, with the first end portions spaced from the second end portions, respectively, in the direction of the longitudinal axis of the shaft, the first end portions for pivotally holding the probe and the second end portions pivotally mounted to the counterweight, such that when the probe is pivotally mounted to the first end portions of the pair of levers, the pair of levers, the counterweight and the probe form a parallelogram arrangement.

2. The holder of claim 1 further comprising a spring for urging the pair of levers to pivot in a predetermined direction.

3. The holder of claim 2 wherein the counterweight is annular and defines a central opening, and wherein the shaft passes through said central opening.

4. The holder of claim 3 wherein the spring is housed in the counterweight and the counterweight includes a means for adjusting the spring force of the spring.

5. The holder of claim 4 wherein the counterweight defines a radially disposed opening for receiving said spring and said spring force adjusting means comprises a spring housing disposed at one end of said opening and a radially adjustable plunger secured to said housing in said opening and contacting one end of the spring.

6. The holder of claim 1 wherein the pair of levers is a first pair of levers and wherein the holder further comprises a second pair of levers disposed in a plane parallel to said first pair of levers, each lever of the second pair of levers having a first end portion and a second end portion, with the first end portions spaced from the second end portions, respectively, in the direction of the longitudinal axis of the shaft, the first end portions for pivotally holding the probe and the second end portions pivotally mounted to the counterweight, such that when the probe is pivotally mounted to the first end portions of the second pair of levers, the second pair of levers, the counterweight and the probe form a parallelogram arrangement.

7. The holder of claim 6 further comprising a first bar linking one lever of said first pair of levers to one lever of said second pair of levers such that the linked levers and bar form a substantially H-shape.

8. A holder for mounting a probe to a ring of a rotary type scanner, the probe having a sensing beam directed along a probe axis of the probe for inspecting a pipe extending through the ring, the scanner having means for rotating the ring such that the holder, when mounted to the ring, is movable 360 degrees around the pipe, the holder comprising:
a shaft for mounting to the ring of the rotary type scanner, the shaft having a longitudinal axis;
a support rotatably mounted to the shaft;
a first counterweight;
a pair of levers pivotally mounted to the support, each of the pair of levers having a first end portion and a second end portion, the first end portions for pivotally holding the probe and the second end portions pivotally mounted to the first counterweight, such that when the probe is pivotally mounted to the first end portions of the pair of levers, the pair of levers, the first counterweight and the probe form a parallelogram arrangement; and
a pair of contact arms pivotally mounted to the support, the pair of contact arms disposed relative to each other to form a gap therebetween for receiving the pipe to be inspected.

9. The holder of claim 8 further comprising a spool secured to each contact arm and a constant force spring mounted between the spools whereby the arms are urged closer together by the spring.

10. The holder of claim 9 further comprising a gear box having a pair of identical meshed gears, one contact arm being secured to a shaft of one gear of said pair of identical meshed gears and the other contact arm being secured to a shaft of the other gear of said pair of identical meshed gears whereby the contact arms move simultaneously and symmetrically in relation to the probe.

11. The holder of claim 8 further comprising a spring for urging the pair of levers to pivot in a predetermined direction.

12. The holder of claim 11 wherein the support includes a tubular housing rotatably mounted to the outside of the shaft and a plate fixedly mounted on the tubular housing, and wherein each of the pair of levers is mounted to the plate such that the counterweight is located on one side of the plate and the probe, when mounted to the first end portions of the levers, is located on the other side of the plate.

13. The holder of claim 12 wherein the counterweight is annular and defines a central opening and wherein the shaft passes through said central opening.

14. The holder of claim 12 wherein the pair of contact arms are mounted at a first end of the plate and a second counterweight is mounted to a second end of the plate to counterbalance the pair of contact arms.

15. The holder of claim 14 further comprising a radially extending key secured to said shaft, said first counterweight defining a radially deposed key slot for receiving said key, whereby the rotation of the first counterweight about the shaft is restricted by the width of the key slot.

16. The holder of claim 8, further comprising a second counterweight mounted to the support for counterbalancing the weight of the pair of contact arms.

17. The holder of claim 16 wherein
the support includes a tubular housing rotatably mounted to the outside of the shaft and a plate fixedly mounted on the tubular housing,
wherein each of the pair of levers is mounted to the plate such that the first counterweight is located on one side of the plate and the probe, when mounted to the first end portions of the levers, is located on the other side of the plate, and
wherein the pair of contact arms are mounted at a first end of the plate and the second counterweight is mounted to a second end of the plate.

18. The holder of claim 17 further comprising:
a spool secured to each contact arm,
a constant force spring mounted between the spools whereby the arms are urged closer together by the spring, and
a gear box having a pair of identical meshed gears, one contact arm being secured to a shaft of one gear of said pair of identical meshed gears and the other contact arm being secured to a shaft of the other gear of said pair of identical meshed gears whereby the contact arms move simultaneously and symmetrically in relation to the probe.

19. The holder of claim 18 further comprising means for fixedly locating the second counterweight at one of a plurality of locations spaced from the shaft.

20. A scanning device for measuring the wall thickness of extruded pipe, the scanning device comprising:
a rotary scanner having a ring for receiving extruded pipe therethrough and means for rotating the ring;
a probe having a sensing beam directed along a probe axis of the probe for measuring the wall thickness of the pipe extending through the ring;
a shaft connected to the ring of the rotary scanner, the shaft having a longitudinal axis;
a support rotatably mounted to the shaft;
a counterweight;
a pair of levers pivotally mounted to the support, each of the pair of levers having a first end portion and a second end portion, with the first end portions spaced from the second end portions, respectively, in the direction of the longitudinal axis of the shaft, the first end portions pivotally mounted to the probe and the second end portions pivotally mounted to the counterweight, wherein the pair of levers, the counterweight and the probe form a parallelogram arrangement; and
a pair of contact arms pivotally mounted to the support, the pair of contact arms disposed relative to each other to form a gap therebetween for receiving the extruded pipe to be measured.

* * * * *